Oct. 28, 1969   J. CALDWELL   3,474,855
NATURAL DRAUGHT DRY COOLING TOWERS
Filed Dec. 12, 1966   2 Sheets-Sheet 1

APPLICANT
John Caldwell
BY
Misegades & Douglas
ATTORNEYS

United States Patent Office 3,474,855
Patented Oct. 28, 1969

3,474,855
NATURAL DRAUGHT DRY COOLING TOWERS
John Caldwell, Rugby, England, assignor to The English Electric Company Limited, London, England, a British company
Filed Dec. 12, 1966, Ser. No. 601,038
Claims priority, application Great Britain, Dec. 14, 1965, 53,047/65
Int. Cl. F24h *3/00;* F28f *13/12;* F24b *1/06*
U.S. Cl. 165—47          2 Claims

ABSTRACT OF THE DISCLOSURE

In a natural draught dry cooling tower the base of the tower shell 10 is supported clear of the ground to provide a peripheral opening and coolers 13 are disposed around and within said peripheral opening. Walls 16 are provided at spaced positions around the tower base which extend radially outwardly from said coolers and thus divide the space between said peripheral opening and said coolers into compartments. Such an arrangement encourages air to be drawn through the coolers and into the tower more efficiently.

---

This invention relates to dry cooling towers comprising a tower shell generally-circular in plan and a plurality of coolers arranged inside the shell around and below the base thereof, for cooling water by means of a stream of air induced to flow through the coolers.

The invention is especially applicable, though not confined, to very large cooling towers of the kind having an ellipsoidal or a tent-shaped shell; such towers have been proposed for example with an ellipsoidal shell having an internal diameter of 1500 feet, and woud take the place of a large number of cooling towers of the conventional hyperbolic shape.

In a dry cooling tower maldistribution of airflow through the coolers is found to occur under windy conditions, which adversely affects the performance of the cooling tower. It is an object of the present invention to control the direction of the said airflow in such a way that such maldistribution is reduced or eliminated, whatever the force, direction or variability of the prevailing winds outside the tower may be.

According to the invention, there are provided a plurality of walls extending under the shell of the cooling tower, radially outwards from the coolers. This ensures that the general direction of the airflow through any given cooler will be approximately radial irrespective of the external wind conditions.

According to a preferred feature of the invention, the said walls extend from the bottom of the shell to the ground so as to divide the space below the shell and outside the coolers into a plurality of substantially separate compartments.

Various embodiments of the invention will now be described by way of example and with reference to the accompanying drawings of which:

Figure 1:
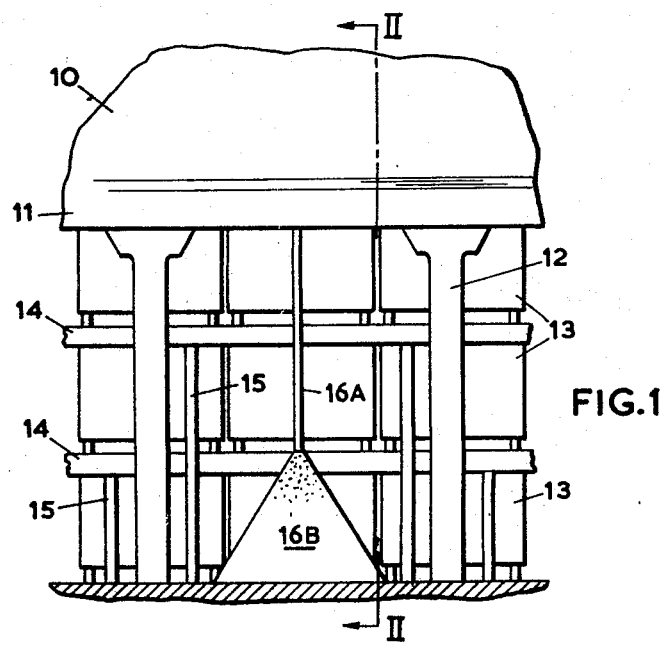
FIG. 1 is an outside elevation of part of the base of one cooling tower according to the invention.
Figure 2:
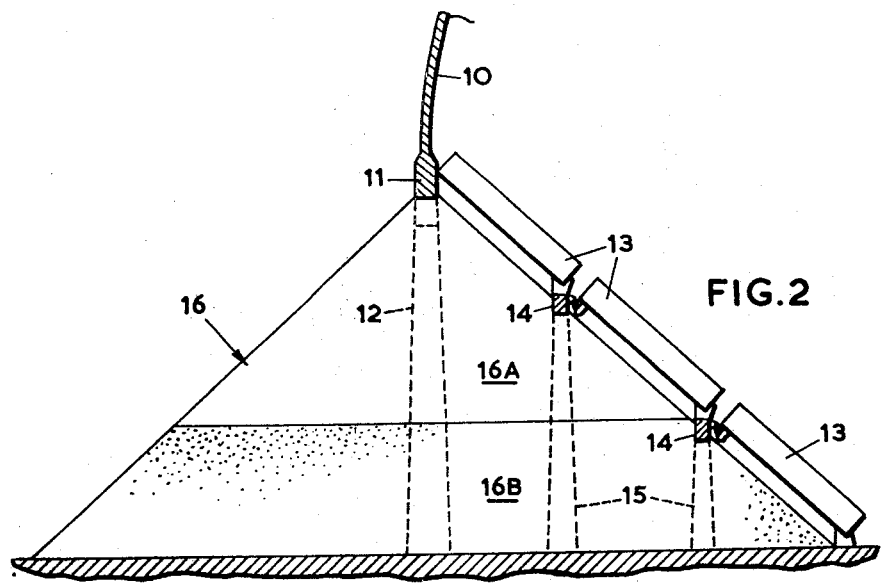
FIG. 2 is a simplified section on the line II—II of FIG. 1.

With reference firstly to FIGS. 1 and 2, a dry cooling tower comprises a concrete shell 10, generally-circular in plan and terminating at its bottom periphery in a ring beam 11 supported on a number of equally-spaced concrete columns 12. Extending from the ring beam 11 to the ground inside the tower are three rows of coolers 13, inclined to the vertical and in line with each other so as to form a continuous bank of coolers with its upper edge radially outwards of its lower edge. In the coolers 13, water is cooled by indirect heat exchange with air induced to flow past the columns 12, through the coolers and up the shell 10. The top two rows of coolers 13 are supported on circular ring beams 14, each of which is itself supported at suitable intervals on concrete columns 15.

At regular intervals around the base of the tower there are provided radial walls 16 below the shell and extending outwards from the coolers 13. The walls 16 thus divide the space below the shell and outside the coolers into compartments, and so help to maintain the flow of air in a direction radially inwards to the coolers and to minimise external wind effects which tend to deflect the flow from this radial direction, thus adversely interfering with the performance of the cooling tower. The upper part 16A of each wall 16 is of concrete and the lower part 16B is of earth or other material such as power station ash, the surface of which is stabilised with cement or other suitable means to prevent erosion.

Figure 3:
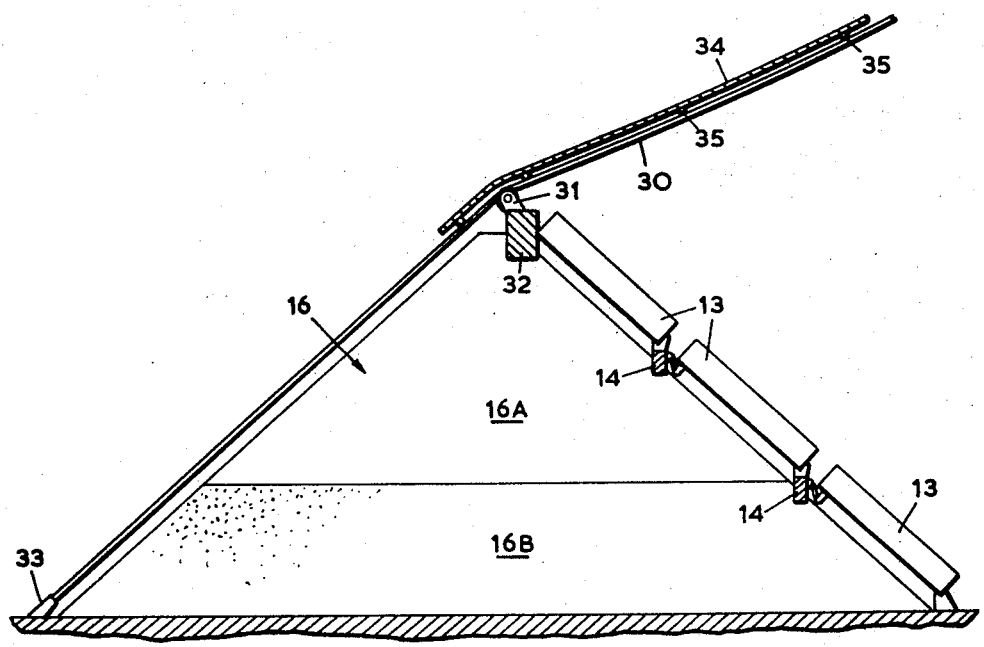
FIG. 3 is a section, corresponding to FIG. 2 but showing part of the base of another cooling tower according to the invention.

FIG. 3 shows part of another type of cooling tower. A number of main suspension cables 30 radiate outwardly and downwardly from a central column (not shown), pass over sheaves 31 on a ring beam 32 coaxial with the column, and terminate at anchorages 33 on the ground. Three rows of inclined coolers 13 are arranged in the same way as in FIGS. 1 and 2 between the ring beam 32 and the ground inside the tower.

A thin shell 34, of metal sheet or other suitable material, is supported on circumferential purlin cables 35 which in turn are supported on the main cables 30.

Below every third main cable 30 is a radial wall 16 similar to that shown in FIGS. 1 and 2.

If desired, some of the weight of the structure in both the arrangements described herein may be taken by the walls 16, provided they are made strong enough. In the case of FIGS. 1 and 2, the walls 16 may be made to take the whole weight of ring beam 11 and shell 10, so eliminating the columns 12 or similar support structure. Similarly the walls 16 may be so designed that they can take the place of the columns 15 as supports for the ring beams 14. The form of construction described for the walls 16 is only one example: they could be of timber or metal or asbestos sheet for example, with or without a strengthening framework. Alternatively each wall may be entirely of concrete, reinforced or prestressed.

The walls 16 need not extend all the way from the ring beam to the ground: it may in some cases be found necessary to provide the walls for only part of this height.

The coolers 13 will normally be divided into sectors or groups of coolers, and if desired one radial wall 16 may be situated at each gap between sectors. In the arrangement shown in FIG. 3, the walls 16 can be at any convenient interval, not necessarily at every third main cable 30.

The shell 10 of the cooling tower in FIGS. 1 and 2 may for example be of hyperboloidal or ellipsoidal design. A ring beam is not essential to the present invention, though in the case of shell not having a ring beam, the coolers will still usually extend from the shell to the ground.

The inclined coolers 13 may be arranged and supported in any suitable way, for example as described in assignee's copending application Ser. No. 600,818, filed Dec. 12, 1966 now Patent No. 3,434,529 granted Mar. 25, 1969, for Dry Cooling Towers. They need not be ararnged in a plurality of horizontal rows as described herein, nor need they be inclined to the vertical For example, there may be a single row of coolers, vertical or inclined.

The walls 16 may extend radially outwards a considerable distance: their shape and dimensions will be determined by the air flow requirements.

The whole of each wall 16 may if desired be of concrete or masonry or may comprise a clad framework of suitable materials.

I claim:

1. A natural draught dry cooling tower comprising a circular shell the base of which is supported clear of the ground to provide a peripheral opening, and a plurality of coolers arranged in a circle around and within said peripheral opening for cooling water by means of a stream of air induced to flow through said coolers, wherein the improvment comprises a plurality of divider walls within the peripheral opening and spaced around the coolers, said divider walls constituting support members for said coolers and extending radially outwardly from the coolers beyond the outer peripheral extent of said tower base for dividing the space between said peripheral opening and said coolers into a plurality of substantially separate compartments.

2. A cooling tower according to claim 1 wherein the inward ends of said walls are sloped, ring beams are provided on said inward ends of said walls and said coolers are supported on said ring beams, said coolers sloping inwardly from the inner peripheral extent of said tower base to the ground.

References Cited

UNITED STATES PATENTS

| 3,175,960 | 3/1965 | Kassett | 165—122 X |
|---|---|---|---|
| 3,367,413 | 2/1968 | Forster | 165—96 |
| 2,732,190 | 1/1956 | Mart | 165—122 X |
| 2,891,773 | 6/1959 | Heller | 165—125 X |
| 3,305,006 | 2/1967 | Daltry | 165—124 |

FOREIGN PATENTS 630,823  10/1899  Great Britain.

ROBERT A. O'LEARY, Primary Examiner

THEOPHIL W. STREULE, Assistant Examiner

U.S. Cl. X.R.

165—125